US 8,208,969 B2

(12) United States Patent
Wang

(10) Patent No.: US 8,208,969 B2
(45) Date of Patent: Jun. 26, 2012

(54) ELECTRONIC DEVICE AND METHOD FOR RINGTONE CONTROL

(75) Inventor: Gui-Peng Wang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 57 days.

(21) Appl. No.: 12/831,276

(22) Filed: Jul. 7, 2010

(65) Prior Publication Data

US 2011/0151939 A1    Jun. 23, 2011

(30) Foreign Application Priority Data

Dec. 17, 2009   (CN) .......................... 2009 1 0311723

(51) Int. Cl.
*H04M 1/00*        (2006.01)

(52) U.S. Cl. ..................................... 455/567; 455/456.4
(58) Field of Classification Search .................. 455/418, 455/419, 567, 456.4
See application file for complete search history.

(56) References Cited

U.S. PATENT DOCUMENTS

2005/0195952 A1*   9/2005   Dyer et al. ............... 379/201.01
* cited by examiner

*Primary Examiner* — Raymond Dean
(74) *Attorney, Agent, or Firm* — Altis Law Group, Inc.

(57) ABSTRACT

An electronic device providing ringtone control and method include an infrared sensor. When the electronic device receives an incoming call, the electronic device turns on the infrared sensor if the incoming call has not been answered within a first time period. If one or more human bodies are detected by the sensor, the electronic device turns off the ringtone of the electronic device when the incoming call has not been answered within a second time period.

16 Claims, 3 Drawing Sheets

ELECTRONIC DEVICE AND METHOD FOR RINGTONE CONTROL

BACKGROUND

1. Technical Field

Embodiments of the present disclosure relate to user interfaces, and more particularly to a method and electronic device providing ringtone control.

2. Description of Related Art

Portable electronic devices such as mobile phones, personal digital assistants (PDAs), and digital cameras are becoming increasingly compact and powerful. However, the portable electronic devices can sometimes present certain inconvenience. For example, unanswered incoming calls on a mobile phone can be annoying to bystanders even if the mobile phone is in vibration mode.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as software and/or hardware unit and may be stored in any type of computer-readable medium or other computer storage electronic device.

Figure 1:
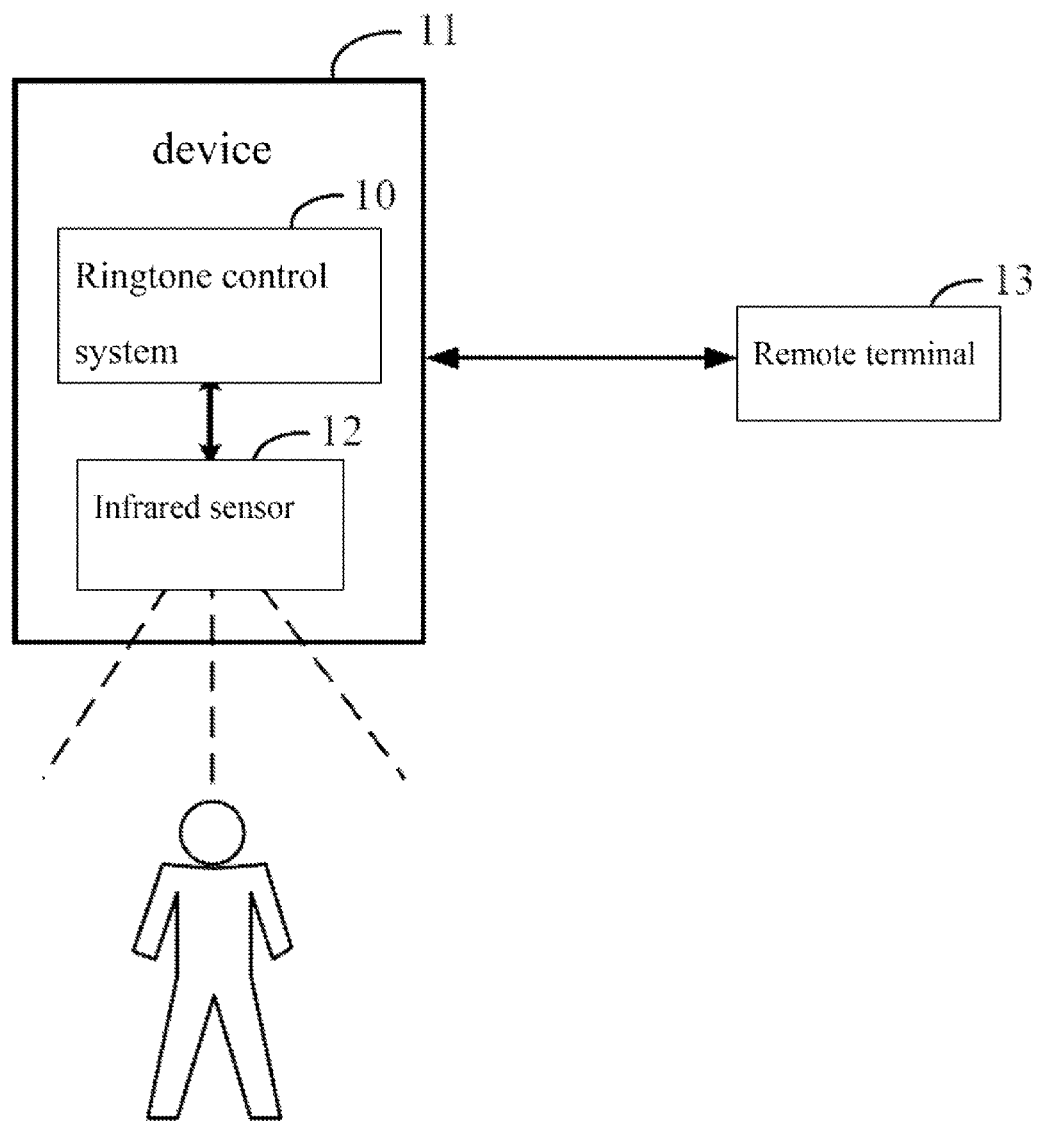
FIG. 1 is an application environment of an electronic device providing ringtone control in communication with a user and a remote terminal.

FIG. 1 is an application environment of an electronic device 11 providing ringtone control in communication with a user and a remote terminal 13.

The electronic device 11 includes a ringtone control system 10 and an infrared sensor 12. In one embodiment, the infrared sensor 12 is operable to measure received infrared radiation emitted by one or more persons within a predetermined radius of the infrared sensor 12. In another embodiment, the infrared sensor 12 incorporates an infrared transmitter to scan approaching objects for further confirmation of presence of persons. Depending on the embodiment, the electronic device 11 can be a mobile phone, for example.

Figure 2:
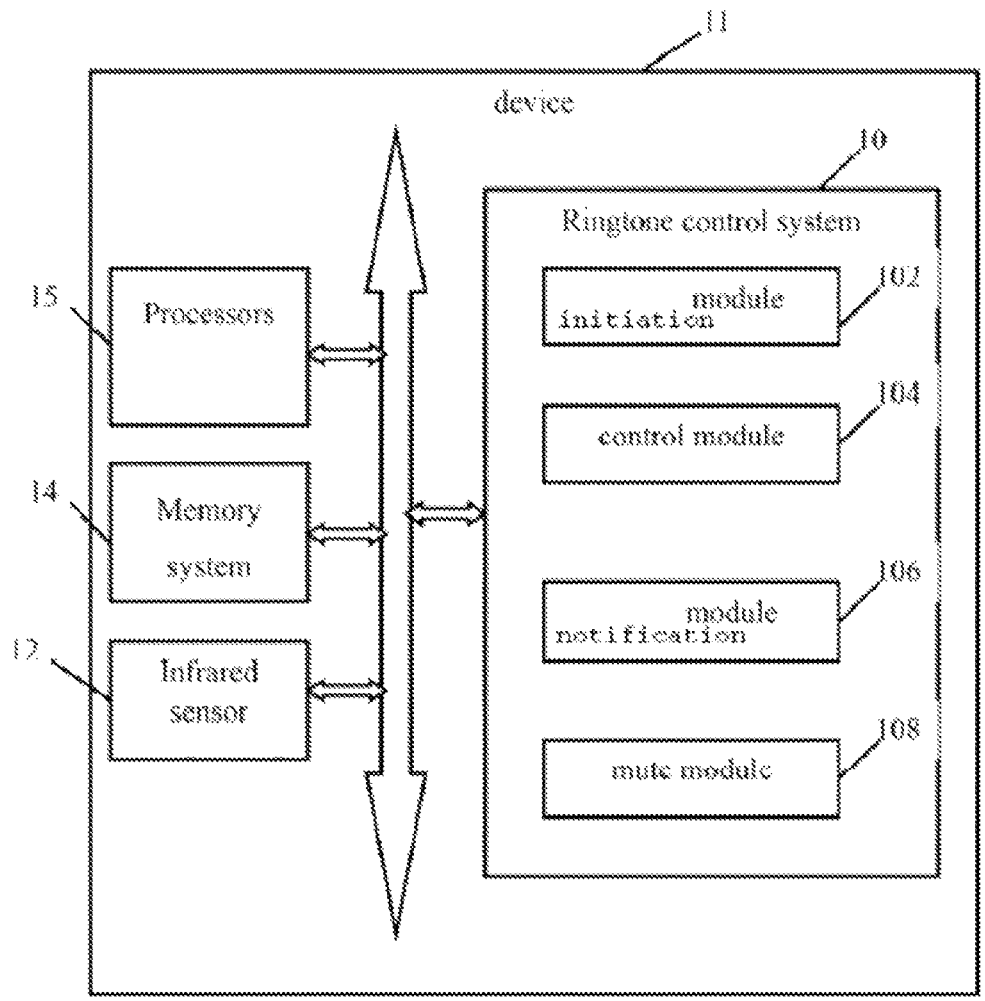
FIG. 2 is a block diagram of one embodiment of the electronic device providing ringtone control.

FIG. 2 is a block diagram of one embodiment of the electronic device 11 for ringtone control. The ringtone control system 10 includes an initiation module 102 to initiate the system 10, a control module 104 to turn the infrared sensor 12 on and off, a notification module 106 to inform the remote terminal 13 and a mute module 108 to turn off the ringtone of the electronic device 11. One or more computerized codes of the modules are stored in a memory system 14 and executed by one or more processors 15 of the electronic device 11.

In the embodiment, the initiation module 102 initiates the system 10 when the electronic device 11 receives an incoming call from the remote terminal 13. The control module 104 turns on the infrared sensor 12 if the call has not been answered within a first time period. The control module 104 turns off the infrared sensor 12 if the call has not been answered within a second time period.

In the embodiment, if the call has not been answered within a second time period, the mute module 108 turns off the ringtone of the electronic device 11 if the one or more persons are detected, otherwise the notification module 106 informs the remote terminal 13. In the embodiment, the first time period is 10 seconds and the second time period is 20 seconds.

Figure 3:
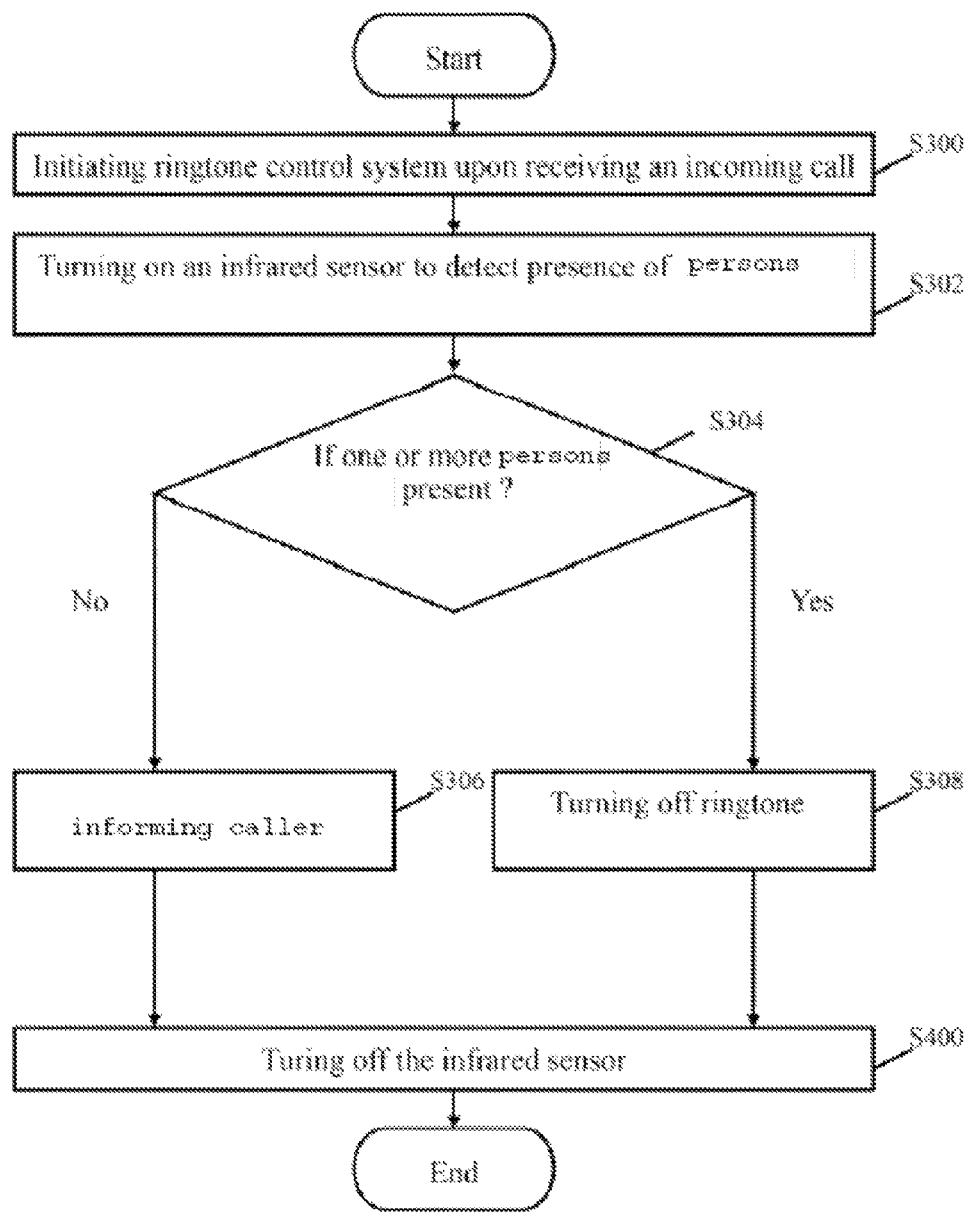
FIG. 3 is a flowchart illustrating one embodiment of a method for ringtone control for an electronic device

FIG. 3 is a flowchart illustrating one embodiment of a method for ringtone control on an electronic device 11. Depending on the embodiments, additional blocks may be added, others removed, and the ordering of the blocks may be changed.

In the embodiment, in block S300, the initiation module 102 initiates the system 10 when the electronic device 11 receives an incoming call from the remote terminal 13. In block S302, the control module 104 turns on the infrared sensor 12 if the call has not been answered within the first time period. In block S302, the infrared sensor 12 detects whether the one or more persons are present within the predetermined radius the infrared sensor 12.

In block S306, the notification module 106 informs the remote terminal 13 if the infrared sensor 12 detects no human bodies and the call has not been answered within a second time period. In block S308, the mute module 108 turns off the ringtone of the electronic device 11 if the infrared sensor 12 detects no human bodies and the call has not been answered within a second time period. In block S400, the control module 104 turns off the infrared sensor 12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
    an infrared sensor;
    a memory system;
    one or more processors; and
    a ringtone control system comprising one or more programs stored in the memory system and configured to be executed by the one or more processors, the one or more programs comprising:
        an initiation module to initiate the ringtone control system when the electronic device receives an incoming call;
        a control module to turn on the infrared sensor if the incoming call has not been answered within a first time period; and
        a mute module to turn off a ringtone of the electronic device if the incoming call has not been answered within a second time period after turning on the infrared sensor;
    wherein the infrared sensor detects the presence of one or more persons during the second time period.

2. The electronic device as claimed in claim 1, wherein the ringtone control system further comprises a notification module to inform a caller if the infrared sensor does not detect the one or more persons during the second time period.

3. The electronic device as claimed in claim 1, wherein the control module turns off the infrared sensor after the mute module turns off the ringtone.

4. The electronic device as claimed in claim 2, wherein the control module turns off the infrared sensor after the notification module informs the caller.

5. The electronic device as claimed in claim 1, wherein the infrared sensor measures received infrared radiation emitted by the one or more persons.

6. The electronic device as claimed in claim 1, wherein the infrared sensor incorporates an infrared transmitter to scan approaching objects for further confirmation of the presence of persons.

7. A method for ringtone control for an electronic device, comprising:
- initiating a ringtone control system of the electronic device when the electronic device receives an incoming call;
- turning on an infrared sensor of the electronic device if the incoming call has not been answered within a first time period;
- informing a caller if the infrared sensor does not detect one or more persons during the second time period; and
- turning off a ringtone of the electronic device if the incoming call has not been answered within a second time period after turning on the infrared sensor;
- wherein the infrared sensor is operable to detect the presence of the one or more persons during the second time period.

8. The method as claimed in claim 7, wherein the method further comprises turning off the infrared sensor after turning off the ringtone.

9. The method as claimed in claim 7, wherein the method further comprises turning off the infrared sensor after informing the caller.

10. The method as claimed in claim 7, wherein the infrared sensor measures received infrared radiation emitted by the one or more persons.

11. The method as claimed in claim 7, wherein the infrared sensor incorporates an infrared transmitter to scan approaching objects for further confirmation of the presence of persons.

12. A computer readable storage medium having stored therein instructions, that when executed by an electronic device with an infrared sensor and a ringtone control system, causes the electronic device to:
- initiate the ringtone control system when the electronic device receives an incoming call;
- turn on the infrared sensor if the incoming call has not been answered within a first time period;
- inform a caller if the infrared sensor does not detect one or more persons during the second time period; and
- turn off a ringtone of the electronic device if the incoming call has not been answered within a second time period after turning on the infrared sensor;
- wherein the infrared sensor is operable to detect the presence of the one or more persons during the second time period.

13. The computer readable storage medium as claimed in claim 12, wherein the instructions further cause the electronic device to turn off the infrared sensor after turning off the ringtone.

14. The computer readable storage medium as claimed in claim 12, wherein the instructions further cause the electronic device to turn off the infrared sensor after informing the caller.

15. The computer readable storage medium as claimed in claim 12, wherein the infrared sensor measures received infrared radiation emitted by the one or more persons.

16. The computer readable storage medium as claimed in claim 12, wherein the infrared sensor incorporates an infrared transmitter to scan approaching objects for further confirmation of the presence of one or more persons.

* * * * *